June 7, 1960 L. V. GUEST 2,939,464

SOUND REPRODUCING APPARATUS

Filed May 12, 1958 6 Sheets-Sheet 1

INVENTOR

Lawrence V. Guest

BY

Ralph B. Stewart

ATTORNEY

June 7, 1960 L. V. GUEST 2,939,464

SOUND REPRODUCING APPARATUS

Filed May 12, 1958 6 Sheets-Sheet 2

INVENTOR
Lawrence V. Guest
BY
Ralph B. Stewart
ATTORNEY

June 7, 1960 L. V. GUEST 2,939,464

SOUND REPRODUCING APPARATUS

Filed May 12, 1958 6 Sheets-Sheet 3

INVENTOR

Laurence V. Guest

BY

Ralph B. Stewart

ATTORNEY

June 7, 1960 L. V. GUEST 2,939,464

SOUND REPRODUCING APPARATUS

Filed May 12, 1958 6 Sheets-Sheet 4

INVENTOR
Laurence V. Guest
BY
Ralph B. Stewart
ATTORNEY

INVENTOR
Lawrence V. Guest
BY
Ralph B. Stewart
ATTORNEY

June 7, 1960 L. V. GUEST 2,939,464

SOUND REPRODUCING APPARATUS

Filed May 12, 1958 6 Sheets-Sheet 6

INVENTOR
Lawrence V. Guest
BY
Ralph B. Stewart
ATTORNEY

United States Patent Office 2,939,464
Patented June 7, 1960

2,939,464

SOUND REPRODUCING APPARATUS

Lawrence Vincent Guest, Old Hill, England, assignor to Birmingham Sound Reproducers Limited, Old Hill, England Filed May 12, 1958, Ser. No. 734,453
Claims priority, application Great Britain May 15, 1957
6 Claims. (Cl. 274—10)

The present invention relates to automatic apparatus for use in playing a succession of disc records of various and mixed sizes fed singly in succession on to a turntable by downward movement from the lower end of a stack carried on a spindle extending upwards from the centre of the turntable.

The known apparatus of this kind includes automatic mechanism which upon completion of playing of one record is caused to be driven by the driving motor of the machine and to execute a cycle of operations including raising the reproducer arm to disengage the stylus from the played record, swinging the reproducer outwards to a position outside the path of movement of a record from the stack to the playing position on the turntable, releasing a record from the stack to fall to the playing position, swinging the pick-up arm inwards to position the pick-up over the edge of the record to be played and lowering the pick-up arm to engage the stylus with the record.

The inward and outward swinging movements of the pick-up arm are imparted or controlled by a part of the driven mechanism arranged to make to and fro movements either linearly or about a pivot and its amplitude of movement is usually constant, the complete cycle of automatic operations taking place during one complete to and fro movement.

The records to be played being of different sizes it is necessary to arrange that the automatically executed inward swing of the pick-up arm from the outer position, executed by the to and fro moving member, shall cease temporarily when the stylus is over the edge of the particular size of record on the turntable so that the stylus will engage the commencing part of the record when the pick-up arm is subsequently lowered by the to and fro moving member.

It is known for the purpose of temporarily arresting the inwardly swinging pick-up arm to utilise mechanism comprising a fixed support, a movable arresting member biased in one direction and movable relative to the fixed support into any one of several alternative locating positions, means for determining which of said predetermined positions is occupied by the arresting member in the form of a movable detent co-operating with said arresting member and including a blade extending into the path of movement of records of above a given size falling from the stack to the playing position so that the detent is moved by records contacting said blade and a movable locator member connected for movement in unison with the pick-up arm and adapted to impart swinging movement thereto in both directions and to make abutting engagement with the arresting member to interrupt the swing of said locator member and therefore the pick-up arm in the inward direction at a point corresponding to the setting of the arresting member.

An example of such a pick-up locating mechanism suitable for use with three different sizes of record is that described in the specification of my co-pending application No. 665,911 filed June 17, 1957, in which the arresting member is formed by a bar pivoted intermediate its ends for rocking movement in a vertical plane and arranged to take one or other of three different positions as determined by the detent.

A locator member in the form of a plate arranged for inward and outward swinging movements in unison with the pick-up arm is provided with three separate abutment surfaces one or other of which makes abutting engagement with the lower end of the bar during the inward swing of the pick-up arm from its outer position to interrupt the inward swing of said locator member and therefore of the pick-up arm.

Inward swinging movement of the pick-up arm having been interrupted by the arrestor bar the pick-up arm is thereafter lowered in the usual manner to engage the stylus with the commencing groove of the record to be played.

With the stylus engaged with the record groove it is essential that the pick-up arm shall be free of the restraint of the arresting member so that the stylus may traverse the grooved surface of the record as is necessary during playing, and various proposals have been made for achieving such freedom. In some cases a clutch has been provided between the pick-up arm and the locator member which clutch is engaged when the pick-up arm is required to be swung outwards and inwards with the locator member and disengaged when the inward swing of the locator member has been interrupted by the arrestor member and the pick-up arm lowered to engage the stylus with the record, whilst in the apparatus described in our earlier application referred to above provision is made for the movement of the arrestor bar to a further position independently of the detent, in which the lower end of the bar is away from the path of any one of the abutment surfaces on the locator member so that the latter and the pick-up arm are freed to make swinging movement in unison.

The object of the present invention is an improved mechanism which while providing positive feed of the pick-up arm in both the inward and outward directions between playing of successive records, also enables the pick-up, after its location over the edge of the record to be played, to be freed from the restraint of the arresting member in a simple and reliable manner.

In accordance with the present invention an apparatus of the kind indicated above is provided wherein the mechanism driven by the motor of the machine to execute an automatic cycle of operations includes a member arranged to make to and fro movements of fixed extent to impart outward and inward swinging movements to the pick-up, said member being provided with a coupling piece movable on said member between two positions in each of which said device is movable against restraint, said coupling piece in one of said positions and during movement of the said member in one direction engaging a part movable in unison with the pick-up arm and swinging said part and the pick-up arm outwards and in the other position said coupling piece during movement of said member in the other direction engaging the same or another part movable in unison with the pick-up to swing said same or another part and the pick-up inwards, the said device being caused to move against said restraint from either one of said two positions to the other by reaction against said same or another part when movement of the pick-up arm in either direction is arrested.

The invention is illustrated by way of example in the accompanying drawings in which.

Figure 1:
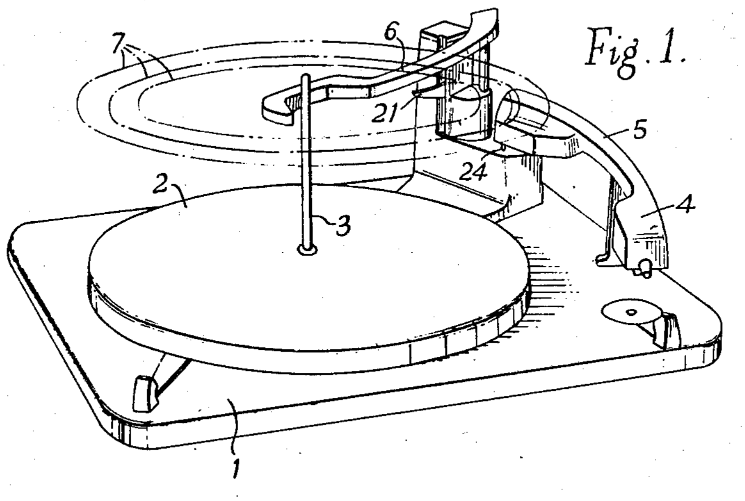
Fig. 1 is a general perspective view of a machine of the kind to which the invention relates.
Figure 7:
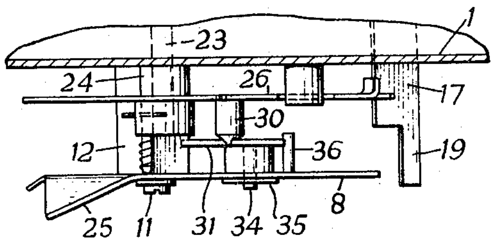
Fig. 7 is an end elevation showing the parts of Figs. 4, 5 and 6.

Referring to the drawings, the machine shown in Fig. 1 is of a generally known kind comprising a motor board 1 supporting a rotatable turntable 2 driven by a motor (not shown), a spindle 3 extending upwards from the centre of the turntable 2 suitable to support a stack of records of three mixed sizes with their centre holes engaged over the spindle 3, a pick-up 4 carried at the free end of a pick-up arm 5 mounted for both transverse and up and down swinging movements in the usual manner and a record-steady arm 6 capable of both up and down and swinging movements about a pivot and normally resting with its free end on the stack of records, indicated diagrammatically at 7 in Fig. 1, on the spindle 3 to maintain said records horizontal.

Machines of this kind include mechanism which on completion of the playing of a record is automatically clutched to a motor driven part of the machine so as to be driven thereby, to carry out a cycle of automatic operations comprising swinging the pick-up arm 5 upwards to disengage the stylus of the pick-up 4 from the played record disc, swinging the raised pick-up arm 5 transversely to a position such as is shown in Fig. 1 outside the edge of a record of any size to be lowered from the stack 7 on to the turntable 2, releasing the lowermost record of the stack 7 to fall from the spindle 3 into the playing position on the turntable or on to the record or records already on the turntable, swinging the pick-up arm 5 inwards to locate the pick-up 4 over the starting edge of the record now to be played and lowering the pick-up arm 5 to engage the stylus of the pick-up 4 with the record now in the playing position.

In the machine illustrated all these movements of the pick-up arm 5 and also the release of a record from the stack 7 to fall to the playing position are effected through the medium of an operating member comprising a plate 8, mounted at the underside of the motor board 1 for to and fro movements of fixed extent about a fixed pivot 9.

The plate 8 is provided with a guide slot 10 engaged over a guide pin 11 carried on a post 12 fixed to the underside of the motor board 1.

Movement is imparted to the plate 8 about the pivot 9 by the engagement of a cam-follower pin 13 in a cam groove 14 on a gear wheel 15 which is clutched automatically in well known manner to a motor-driven part of the machine such as a gear on the turntable boss (not shown) on the conclusion of playing of a record, to execute one revolution and impart one complete to and fro movement to the plate 8 to carry out a complete cycle of automatic operations.

The pick-up locating means is of the kind suitable for use with three sizes of disc records as fully described in the specification of earlier application No. 665,911 and comprising a fixed vertical post 16 extending upwards from the motor board 1 and on which is pivoted an arrestor member in the form of a bar 17 extending above and below the motor board 1 and pivoted at 18 between its ends. The arrestor bar 17 is biased about its pivot 18 so that its upper end tends to approach the post 16 and is capable of taking any one of three operative positions about its pivot 18 in which its lower end 19 occupies either the full line position shown in Fig. 2 or either one of the two dotted line positions indicated by 19′ and 19″ in that figure.

The operative position taken by the arrestor bar 17 is determined by a pivoted detent 20 mounted near the upper end of the post 16 for engagement by the upper end of the arrestor bar 17 and having an arm 21 extending towards the record-supporting spindle 3 and below the level of a stack of records 7 on the spindle, the arrangement being such that when a record of the smallest size is dropped from the stack to the playing position the arm 21 is missed by the falling record, the detent 20 remains unmoved and the lower end of the arrestor bar 17 remains in the position shown in full lines at 19 in Fig. 2. When a record of intermediate size is dropped it engages and moves the arm 21 and the detent 20 to such an extent as to permit the arrestor bar 17 to move into an intermediate position in which its lower end is located as shown at 19′ in Fig. 2, and when a record of largest size is dropped it engages the arm 21 to move it and the detent 20 to a greater extent such that the lower end of the arrestor bar is permitted to take the third position shown at 19″ in Fig. 2 all as fully described in earlier specification No. 665,911.

Figure 2:
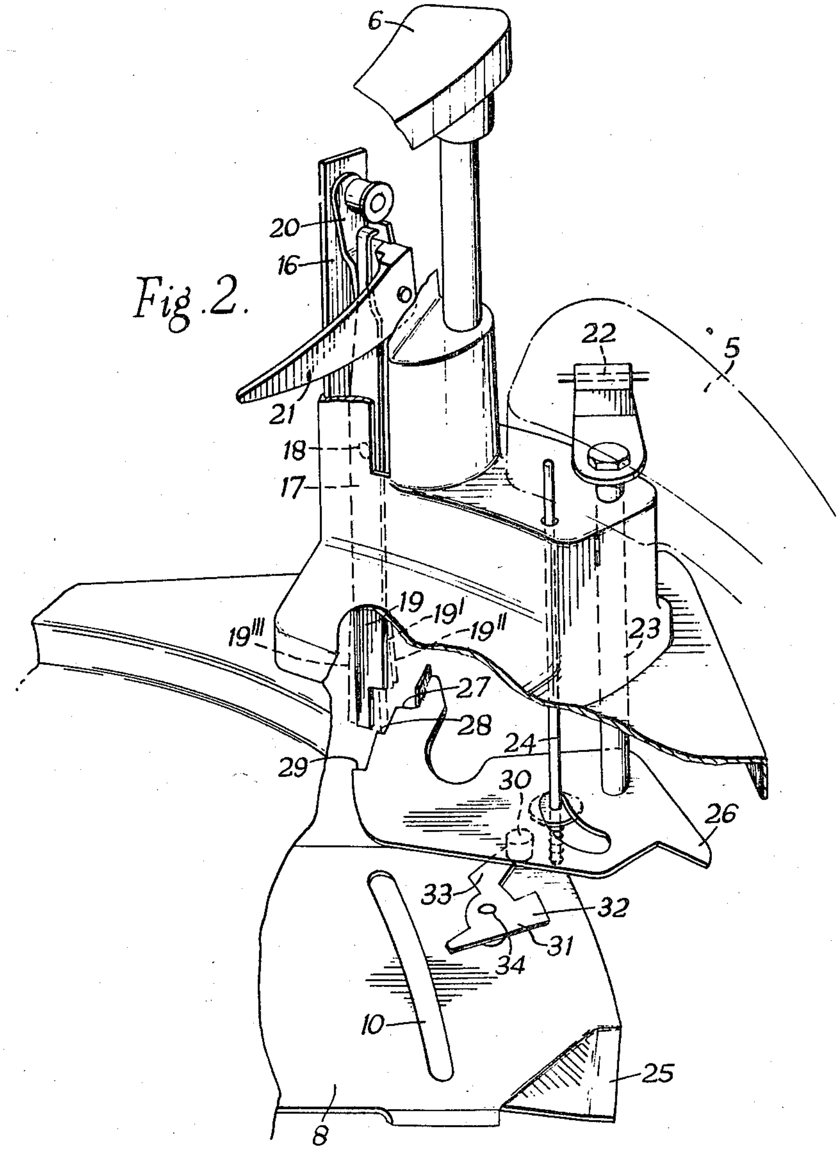
Fig. 2 is a perspective view on a larger scale showing pick-up locating mechanism of the kind described in the specification of earlier application No. 665,911 and to which the present invention has been applied.

The pick-up arm 5 is mounted for limited up and down movement about a horizontal pivot indicated diagrammatically at 22 in Fig. 2, at the upper end of a vertical spindle 23 mounted for rotation in fixed bearings, and the up and down movements are imparted to the pick-up arm 5 by means of a vertically guided pin 24 the lower end of which is engaged by an inclined portion 25 on the main movable plate 8 to raise and lower the pin 24 as the plate 8 is moved, and the upper end of which can make lifting and lowering engagement with the underside of the pick-up arm 5 at a point between the horizontal pivot 22 and the pick-up 4.

To the lower end of the vertical spindle 23 is fixed a locator plate 26 slotted for the passage of the pick-up lifting and lowering pin 24 and movable at all times in unison with the spindle 23 and the pick-up arm 5 about the axis of the spindle 23, and the transverse swinging movements are imparted to the pick-up arm 5 about the axis of the spindle 23 by driving the locator plate 26.

An edge of the locator plate 26 is provided with steps presenting three abutment surfaces 27, 28 and 29 at progressively increasing radial distances from the spindle 23, these abutment surfaces making selective engagement with the lower end of the arrestor bar 17 according to which one of the above described three alternative positions is occupied by the latter, as the locator plate moves in that direction corresponding to inward swing of the pick-up arm 5 to arrest the locator plate 26 and therefore the pick-up arm 5 with the stylus of the pick-up 4 located over the edge of whichever size of record has been dropped on the turntable 2 in readiness for playing.

Figure 3:
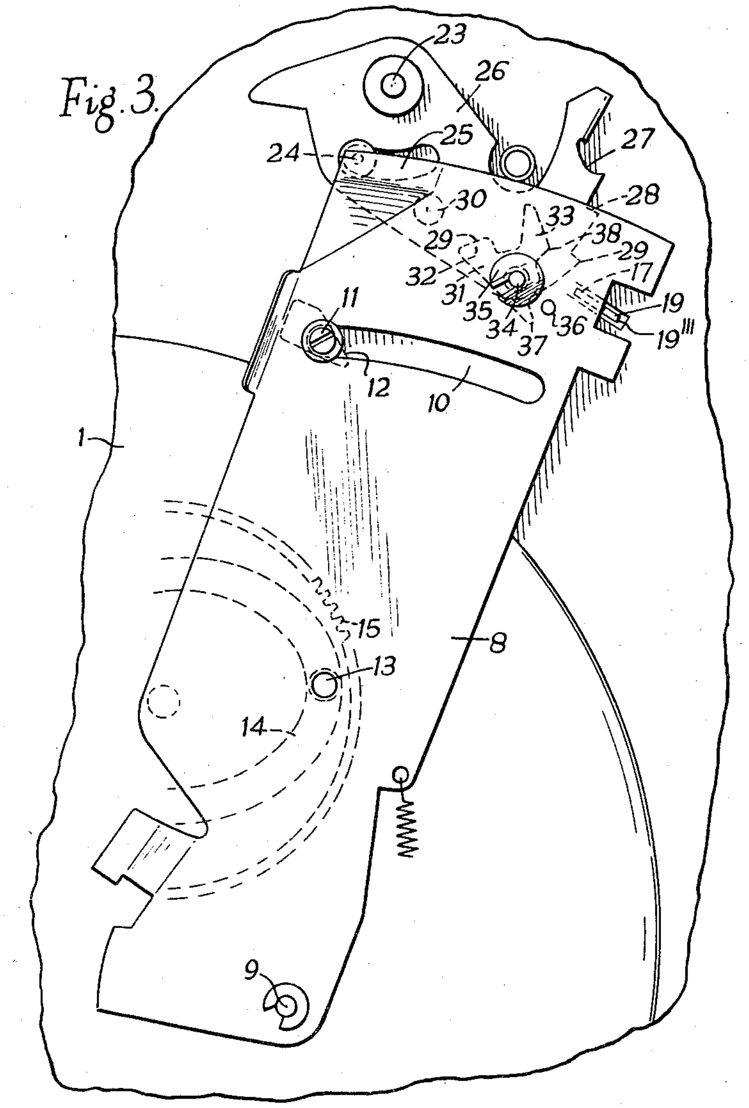
Figs. 3, 4, 5 and 6 are views in underside plan showing the main to and fro moving member and the means for drive-coupling and uncoupling the pick-up arm with and from said main moving member, in various positions taken by the parts in operation.

The arrestor bar 17 is also movable into a fourth and inoperative position by engagement of the plate 8 therewith, in which its lower end 19 is out of the path of any part of the locator plate 26, this position being shown in dotted lines at 19‴ in Figs. 2 and 3 and it remains in this position throughout the playing of a record.

The locator plate 26 is driven by the to and fro moving plate 8 and since the amplitude of movement of the plate 8 is the same for each automatic cycle and extent of inward swing of the locator plate 26 is variable, it is necessary to provide a form of coupling between the plate 8 and the locator plate 26 which permits the plate 8 to continue to move after the locator plate 26 has been arrested and which will nevertheless ensure drive of the plate 26 and the pick-up arm 5 by the plate 8 in the outward direction when next the plate 8 is moved i.e. in the next automatic cycle.

The drive means between the plate 8 and the locator plate 26 is as follows:

On the lower surface of the locator plate 26 is mounted a fixed pin 30 the free end of which is preferably tapered as shown and on the upper side of the to and fro moving plate 8 is mounted a forked coupling piece 31 having two arms 32 and 33.

The coupling piece 31 is fixed to a pivot pin 34 rotatable in a hole in the plate 8 and secured from below the plate 8 by a stiff spring washer 35 such as to impose strong frictional restraint against rotation of the pivot pin 34 and movement of the coupling piece 31 relative to the plate 8.

Figure 4:
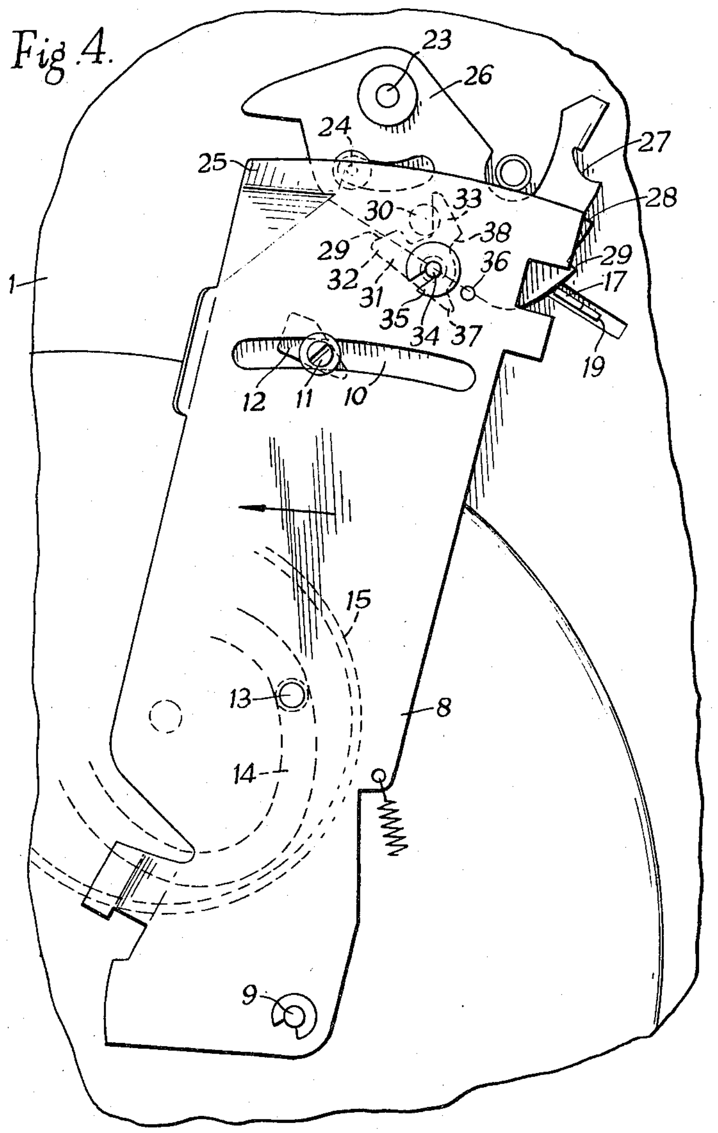

A stop pin 36 serves to limit the rotation of the coupling piece 31 by engagement therewith of projections 37 and 38 on the coupling piece, see Figs. 3 and 4.

The arms 32 and 33 of the coupling piece 31 are each capable of engaging the pin 30 by their adjacent sides to move the locator plate 26 in one direction or the other about the axis of the spindle 23 according to the direction of movement of the plate 8 about its pivot 9.

The operation is as follows:

With a stack of records 7 on the spindle 3 and a record on the turntable being played, the to and fro moving plate 8 is at rest in one of its extreme positions as shown in Fig. 3 in which one edge is engaged with the lower end 19 of the arrestor bar 17 to retain the said lower end in the inoperative position 19''' in which it can make no contact with any part of the locator plate 26 whilst the latter is swinging inwards with the pick-up arm 5 about the axis of spindle 23 during playing. The pick-up arm lifting and lowering pin 24 is in its lowered position with its lower end resting at the lower end of the inclined portion 25 of the plate 8 and the pin 30 beneath the moving locator plate 26 moves in a path spaced from the forked piece 31 on the plate 8.

When playing of the record is completed the gear 15 is clutched automatically in known manner to a driven part of the machine and the cam 14 rotated through one revolution to effect a complete to and fro movement of the plate 8 about its pivot 9 to execute a complete cycle of automatic operations.

Figure 5:
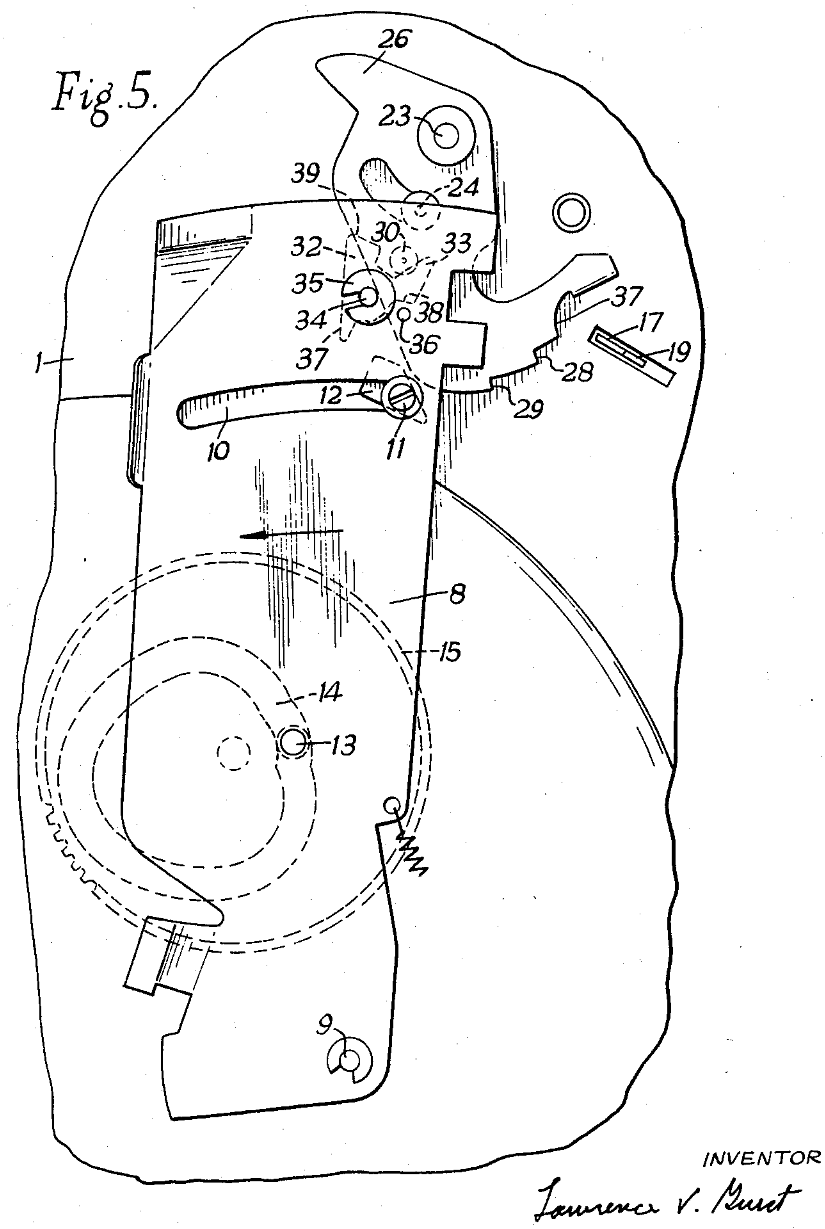

The plate 8 commences to move, counterclockwise in Figs. 3 to 5, and the arrestor bar 17 is freed to move towards the first of its operative positions in which its lower end is located as shown in full lines at 19 in Fig. 2, this position corresponding to that required for locating the pick-up arm 5 for a record of smallest size.

The inclined portion 25 of the plate 8 moves beneath the pin 24 to raise it and thereby lift the pick-up arm 5 about the horizontal pivot 22 and the pick-up arm 5 is thereafter held raised by engagement of the flat horizontal surface of the plate 8 beneath the pin 24.

The forked piece 31 approaches the pin 30 but the position of the piece 31, determined in the course of a previous automatic cycle, is such that the now leading arm 32 of the piece 31 passes the pin 30 and the now trailing arm 33 of the contactor engages the pin 30 (see Fig. 4).

Continued movement of the plate 8 in the counterclockwise direction therefore causes rotation of the locator plate 26 together with the now raised pick-up arm 5 about the axis of the vertical spindle 23 clockwise in Figs. 3 to 6, under the thrust of the arm 33 of the piece 31 which is held against movement on the plate 8 by the restraint of the friction spring washer 35. This movement of the locator plate 26 and the pick-up arm 5 continues until the pick-up arm reaches its fully out-swung position determined by engagement of an edge of the locator plate 26 with the fixed post 12 (Fig. 5), all the steps 27, 28 and 29 having meantime moved past the lower end of the arrestor bar 17 now in the first operative position indicated by 19, from which however it is momentarily displaced by contact of the edge of the locator plate 26 adjacent that step or abutment surface 29 which is at the greatest radial distance from the spindle 23.

The locator plate 26 having met the post 12, further movement of the plate 8 in the same direction causes pivotal movement of the piece 31 on the plate 8 by reaction of the arm 33 against the pin 30 overcoming the frictional restraint of the washer 35, and as a result the other arm 32 of the forked contactor is moved into a position in front of the pin 30 (see Fig. 5).

With the pick-up arm 5 in the fully out-swung position the next record from the lower end of the stack 7 is permitted to fall to the playing position by any known form of release mechanism not shown, which may be conveniently operated by contact of the moving plate 8, and as the record is dropped the arrestor bar 17 either remains in the previously taken first operative position 19 or is caused to take one or other of the alternative operative positions 19' or 19'' according to the size of the dropped record.

Return movement of the plate 8 about its pivot 9 now takes place and the locator plate 26 and pick-up arm 5 are swung counterclockwise about the axis of the spindle 23 by engagement of the arm 32 of the contactor member 31 with the pin 30 and this swinging movement continues until one or other of the steps 27, 28 or 29 on the locator plate 26 meets the lower end 19 of the arrestor bar 17 according to which of the three operative positions 19, 19' or 19'' is occupied by the lower end 19 of the bar whereupon the movement of the locator plate 26 and the pick-up arm 5 is arrested.

Figure 6:
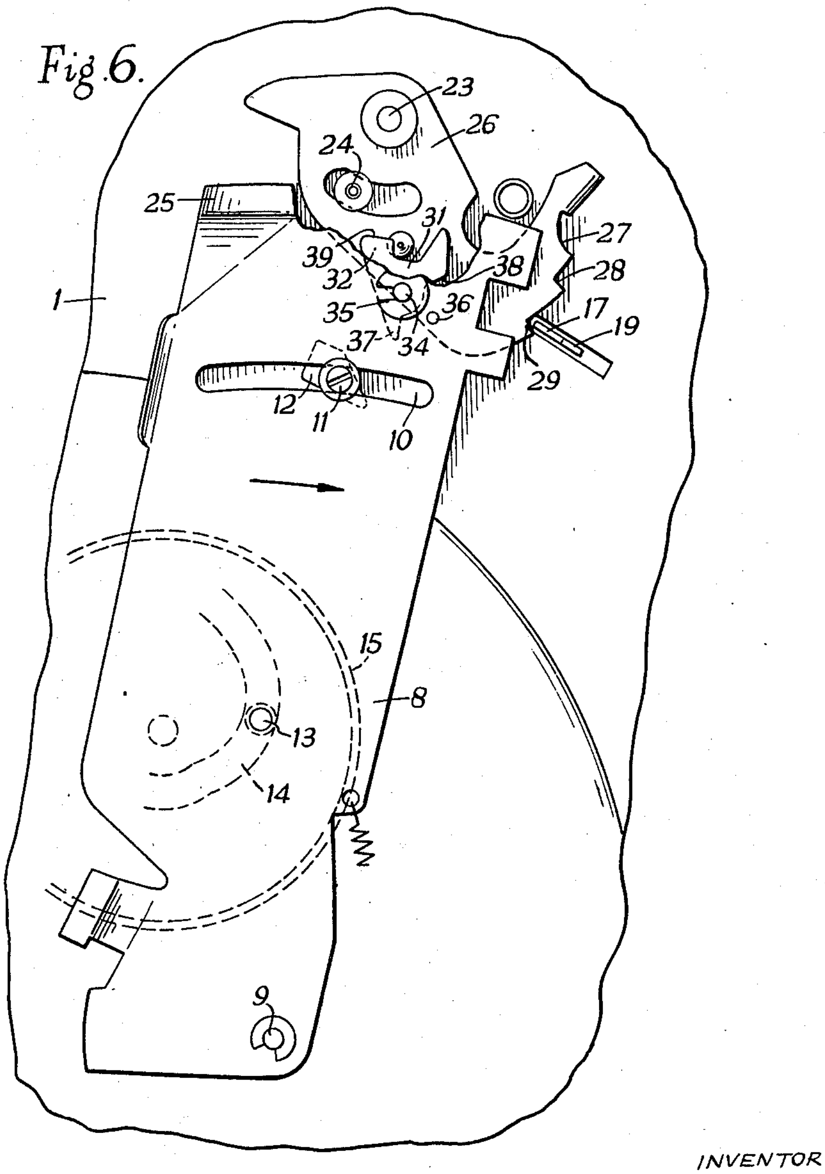

In this position of the arrested pick-up arm 5 the stylus of the pick-up 4 is located over the edge of the record to be played. Fig. 6 shows the two steps 27 and 28 on the locator plate 26 as having passed the end of the arrestor bar 17 and the third step 29 i.e. that at the greatest radial distance from the spindle 23 as being engaged with the lower end 19 of the arrestor bar, this corresponding to a maximum inward swing as required for a record of smallest size.

With the locator plate 26 arrested, the forked coupling piece 31 is again caused to pivot relative to the plate 8 by reaction of the arm 32 against the pin 30 and against the restraint of the friction washer 35 and this pivotal movement of the piece 31 continues until the arm 32 wipes past the pin 30 as the plate 8 returns to its rest position as shown in Fig. 3. The outer end 39 of the arm 32 is formed with an inclination such as to provide a camming lead ensuring that the arms 32 will pass the pin 30 when the latter is required to be engaged and thrust by the arm of the contactor 33 during movement of the plate 8 in the counterclockwise direction during the next succeeding automatic cycle.

As the plate 8 approaches its rest position (Fig. 3) the inclined portion 25 moves from beneath the pin 24 so that the pin may move downwards to lower the pick-up arm 5 to engage the stylus with the starting edge of the record in the playing position and substantially simultaneously with such engagement the edge of the plate 8 engages the lower end 19 of the arrestor bar to move it into and thereafter retain it is the inoperative position 19''' so that the locator plate 26 and the pick-up 5 are made free to move with the vertical spindle 23 for playing the record.

Figure 8:
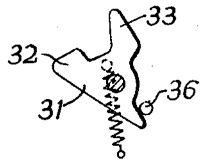
Figs. 8 and 9 show an alternative.
Figure 9:
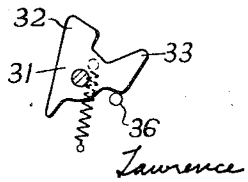

Figs. 8 and 9 illustrate an alternative method of imposing restraint upon rotational movement of the forked coupling piece 31 relative to the plate 8 such as to ensure drive of the locator member 26 to the extent necessary in both directions by the plate 8 and movement of the contactor member from either one of its two positions to the other by reaction against the pin 30 when the locator member is halted.

In this case an "over dead centre" spring 40 is connected between the forked coupling piece 31 and a fixed anchorage 41 on the plate 8.

The spring ensures maintenance of the position of the piece 31 relative to the plate 8 whilst driving the pin 30 on the locator plate.

Arrest of the movement of the locator plate 26 in either direction in the manner previously described causes the piece 31 to move about its pivot on the plate 8 against the restraint of the spring 40 until the spring passes the dead centre, whereupon the contactor member is caused to move to the reverse position with snap action.

I claim:

1. In sound reproducing apparatus for the automatic reproduction of a plurality of disc records in single succession, said apparatus including a pickup arm mounted to swing inwardly and outwardly over the record support, a locator member secured to and swingable with the pickup arm, an adjustable stop cooperating with the locator member and arresting the pickup arm at a point in its inward swing appropriate to the size of the record to be played, and an operating member making a single to and fro movement of fixed extent during each record-changing cycle, the combination of a coupling piece mounted on one of said members and being movable to and fro relative to said one member, means imposing restraint against movement of said coupling piece in either direction relative to said one member, said coupling piece engaging a part on the other member to effect an operating coupling between said operating member and said locator member, said coupling piece during movement of said operating member in the direction to effect inward swing of the pickup arm being operable to move the pickup locator member into engagement with said adjustable stop before the end of the inward stroke movement of said operating member and continued movement of said operating member causing relative movement of said coupling piece with respect to said one member to disengage the coupling piece from the cooperating coupling part before the end of the inward stroke of said operating member, said coupling piece being operative in the other direction of movement of said operating member to move the pickup locator member against a fixed stop before the end of the outward stroke of said operating member and thereafter further movement of the operating member effects movement of the coupling piece with respect to said one member to restore the coupling piece to its original position.

2. Sound reproducing apparatus according to claim 6 wherein said coupling piece comprises a two-arm fork pivotally mounted on said one member for to and fro movement thereon, the two arms of said fork being positioned on opposite sides of a pin fixed to the other member.

3. Sound reproducing apparatus according to claim 2 wherein the pivotal mounting for said two-arm fork provides frictional restraint against movement of said fork with respect to said one member.

4. Sound reproducing apparatus according to claim 2 wherein said means for imposing restraint against movement of said coupling piece comprises an over-dead-center spring operable to move the two-arm fork from either one of its two positions on said one member into the other position with snap action when movement of the pickup locator is arrested.

5. Sound reproducing apparatus according to claim 1 wherein said coupling piece comprises a two-arm fork pivotally mounted on said operating member for to and fro movement thereon, the two arms of said fork being positioned on opposite sides of a pin fixed to said locator member.

6. Sound reproducing apparatus according to claim 5 wherein one of said arms of the fork during movement of the operating member in one direction first engages the said pin to swing the pickup locator inwards to locate the pickup over the commencement of the record to be played and then slides against said pin to overcome the restraint and effect movement of the fork about its pivotal axis on the operating member and to locate the other arm of the fork at the other side of the pin, the said one of said arms of the two-armed fork having a cam surface on the free end thereof co-operating with said pin during early part of the movement of the operating member in the other direction corresponding to inward swing of the pickup arm and ensuring passage of the said one of said arms past the pin and engagement of the other of said arms with the pin during movement of the operating member in said other direction.

References Cited in the file of this patent

UNITED STATES PATENTS

| | | |
|---|---|---|
| 2,568,496 | Hall | Sept. 18, 1951 |
| 2,576,125 | Lapish | Nov. 27, 1951 |
| 2,801,109 | Vistain | July 30, 1957 |